(12) United States Patent
Schmidt et al.

(10) Patent No.: US 8,648,530 B2
(45) Date of Patent: Feb. 11, 2014

(54) AMALGAM TEMPERATURE MAINTAINING DEVICE FOR DIMMABLE FLUORESCENT LAMPS

(75) Inventors: Gabor Schmidt, Budapest (HU); Peter Lucz, Budapest (HU); Jacint Gergely, Budapest (HU); Zsolt Bagoly, Budapest (HU); Tamas Daranyi, Budapest (HU)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 13/173,223

(22) Filed: Jun. 30, 2011

(65) Prior Publication Data
US 2013/0002138 A1 Jan. 3, 2013

(51) Int. Cl.
*H01J 17/22* (2012.01)
(52) U.S. Cl.
USPC .......... 313/547; 313/490; 313/13; 313/15; 315/115; 315/118; 315/125; 315/209 R; 315/246

(58) Field of Classification Search
USPC .......... 313/490, 549–551, 13, 639, 317, 313/318.01, 318.02, 634, 623, 15, 37, 46, 313/629, 547; 315/112, 115, 118, 125, 127, 315/200 R, 209 R, 209 CD, 247, 246, 56, 57, 315/307
See application file for complete search history.

(56) References Cited

U.S. PATENT DOCUMENTS

| | | | |
|---|---|---|---|
| 3,688,148 A * | 8/1972 | Fedorenko et al. | 313/490 |
| 3,859,555 A * | 1/1975 | Latassa et al. | 313/490 |
| 5,095,336 A | 3/1992 | Corona et al. | |
| 5,412,288 A | 5/1995 | Borowiec et al. | |
| 5,841,229 A * | 11/1998 | Borowiec et al. | 313/490 |
| 5,909,085 A | 6/1999 | Nelson | |
| 6,020,689 A | 2/2000 | Gradzki et al. | |
| 6,118,217 A * | 9/2000 | Hammer et al. | 315/58 |
| 6,452,344 B1 | 9/2002 | MacAdam et al. | |
| 6,707,246 B1 * | 3/2004 | Van Den Bogert et al. | 313/490 |
| 7,116,043 B2 * | 10/2006 | Tomiyoshi et al. | 313/317 |
| 8,018,130 B2 * | 9/2011 | Van Den Broek et al. | 313/490 |
| 2009/0200909 A1 * | 8/2009 | Takahashi et al. | 313/44 |
| 2013/0127342 A1 * | 5/2013 | Lucz et al. | 315/115 |

FOREIGN PATENT DOCUMENTS

| | | |
|---|---|---|
| CN | 1489176 A | 4/2004 |
| CN | 1710702 A | 12/2005 |
| EP | 2207404 A1 | 7/2010 |
| JP | 3167786 A | 7/1991 |
| JP | 2002231007 A | 8/2002 |
| WO | 2007091187 A | 8/2007 |

OTHER PUBLICATIONS

PL Search Report dated Oct. 24, 2012 from corresponding PL Application No. P.399732.
GB Search Report and Opinion dated Oct. 29, 2012 from corresponding Application No. GB1211377.5.
NL Search Report dated Mar. 26 2013 from corresponding NL Application No. 2009074, along with unofficial English translation.

* cited by examiner

*Primary Examiner* — Haiss Philogene
(74) *Attorney, Agent, or Firm* — Pearne & Gordon LLP

(57) ABSTRACT

A fluorescent lighting device includes a ballast and a tube. An amalgam is located within the tube. A resistive heater is operatively coupled with the ballast, to receive electrical power from the ballast while the fluorescent lighting device is in an OFF state. The resistive heater is mounted near the amalgam to transfer heat to the amalgam while the fluorescent lighting device is in the OFF state.

19 Claims, 7 Drawing Sheets

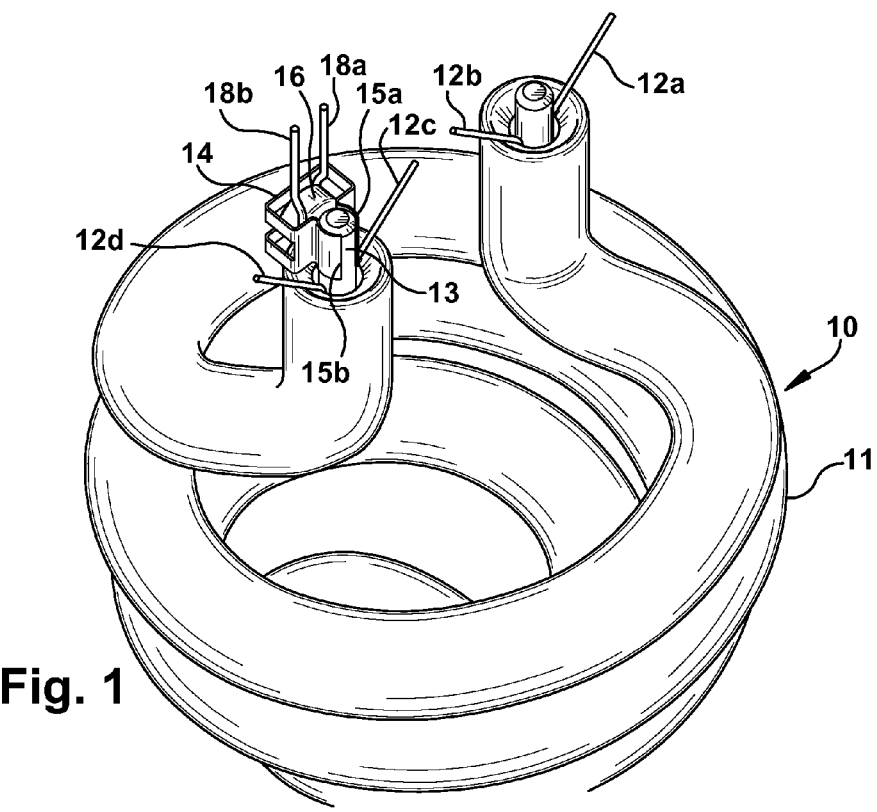
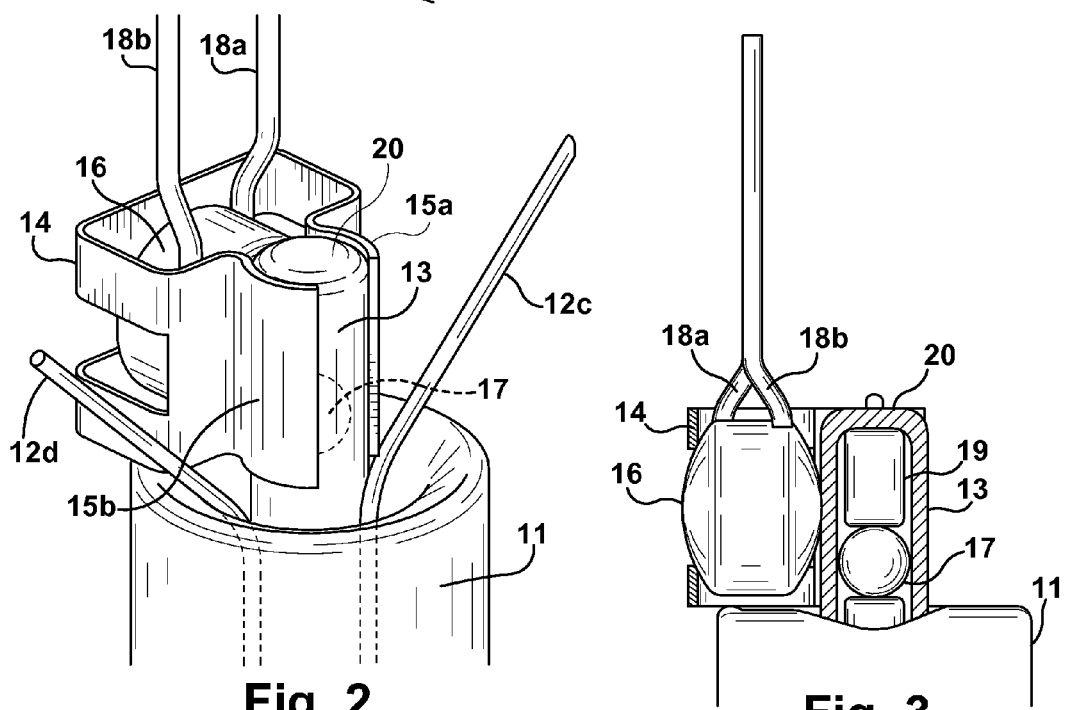
Fig. 1
Fig. 2
Fig. 3

AMALGAM TEMPERATURE MAINTAINING DEVICE FOR DIMMABLE FLUORESCENT LAMPS

BACKGROUND OF THE INVENTION

1. Field of the Invention

The present invention relates to fluorescent lamps, ballasts for fluorescent lamps, and methods of operating fluorescent lamps and ballasts therefore.

2. Description of Related Art

Fluorescent lamps, such as compact fluorescent lamps, contain mercury. The mercury can be in the form of an amalgam rather than a liquid.

Fluorescent lamps exhibit "run-up" when initially turned on. Run-up refers to a gradual increasing of the lamps light output from an initial, low level to a higher, stable level. Run-up is typically finished within the first few minutes of operation of the lamp. However, run-up can be noticeable to a user and is generally undesirable. Thus, there is a need to minimize the run-up exhibited by fluorescent lamps.

Certain fluorescent lamps or light fixtures are adapted to be controlled by advanced light source control devices, such as dimmer switches (e.g., phase cut dimmers) and motion sensors. Such control devices can include microprocessors and/or other circuitry that requires power independently of whether the controlled lamp(s) are ON or OFF. Such control devices require a certain amount of quiescent current flow through the fixture, from which to derive the OFF-state power. However, current flow through the fixture during such an OFF-state can cause abnormal operation (e.g. flashing or flickering) of the lamp(s). Thus, there is a need for improved lighting systems to avoid inadvertent OFF-state flashing while providing quiescent OFF-state current to power advanced lighting control devices.

BRIEF SUMMARY OF THE INVENTION

In accordance with one aspect of the present invention, provided is a fluorescent lighting device including a ballast and a tube. An amalgam is located within the tube. A resistive heater is operatively coupled with the ballast, to receive electrical power from the ballast while the fluorescent lighting device is in an OFF state. The resistive heater is mounted near the amalgam to transfer heat to the amalgam while the fluorescent lighting device is in the OFF state.

In accordance with another aspect of the present invention, provided is a ballast for powering a fluorescent lamp that includes an amalgam. The ballast includes a ballast input with first and second input terminals for receiving AC input power. A rectifier circuit has first and second rectifier output terminals. The rectifier circuit is operatively coupled with the ballast input to convert the AC input power into DC power provided to the first and second rectifier output terminals. An output power stage comprising a power conversion circuit operatively coupled with the rectifier output terminals converts the DC power into ballast output power for the fluorescent lamp. A shunt circuit is connected between the ballast input and the output power stage. The shunt circuit comprises a resistive heater that operates while the fluorescent lamp is in an OFF state, thereby heating the amalgam while the fluorescent lamp is in the OFF state.

BRIEF DESCRIPTION OF THE DRAWINGS

FIG. 1 is a perspective view of a portion of a compact fluorescent lamp;

FIG. 2 is a perspective view of a portion of a compact fluorescent lamp;

FIG. 3 is a section view of a portion of a compact fluorescent lamp;

DETAILED DESCRIPTION OF THE INVENTION

Figure 4:
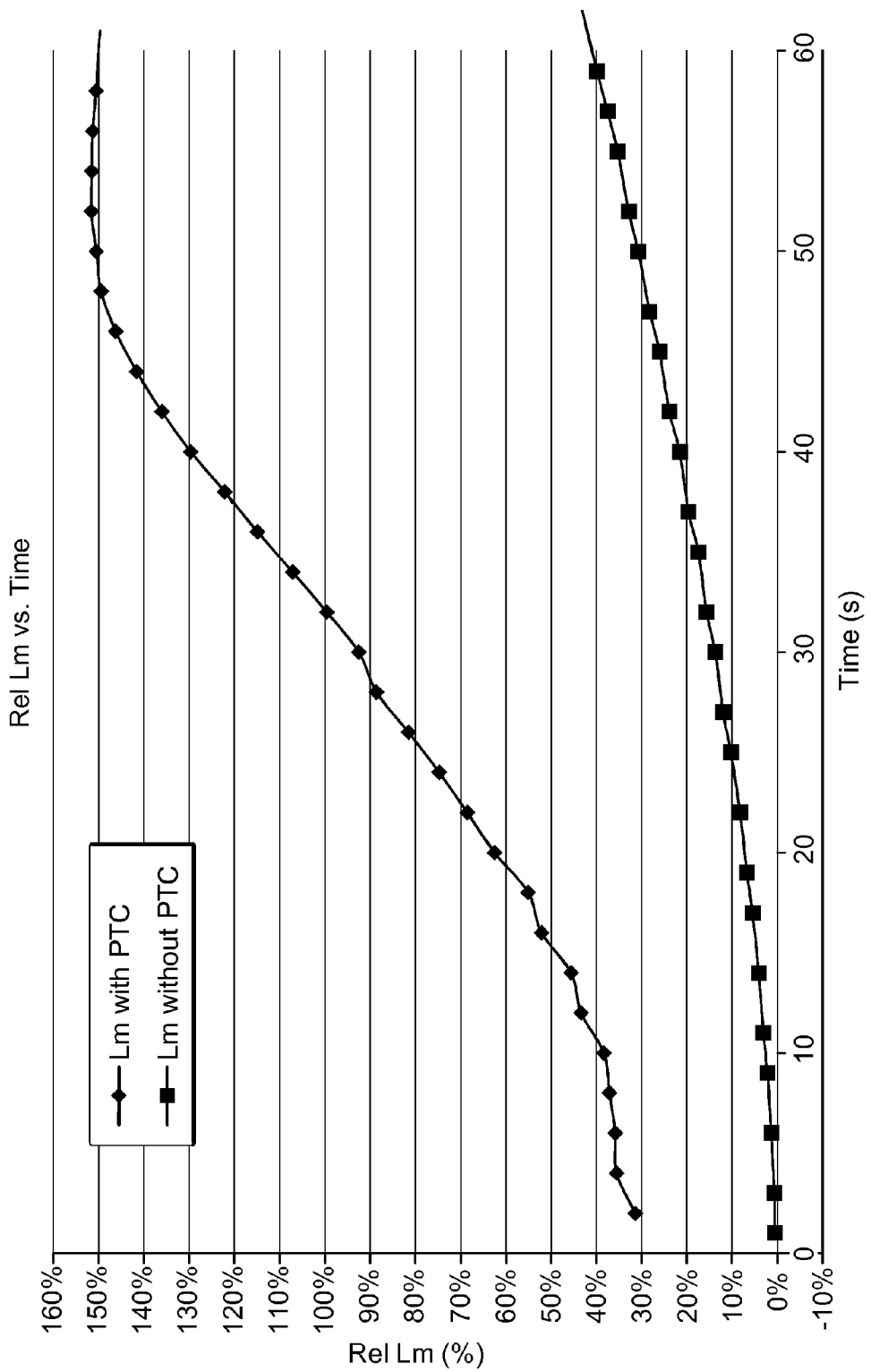
FIG. 4 is a comparative example chart showing lamp run-up.

The present invention relates to fluorescent lamps, ballasts for fluorescent lamps, and methods of operating fluorescent lamps and ballasts therefore. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

FIG. 1 provides a perspective view of a portion of a dimmable compact fluorescent lamp 10. A base for the lamp 10, such as a screw base, is not illustrated in FIG. 10. The lamp 10 in FIG. 1 includes a spiral primary lamp tube 11. Thus, the lamp 10 in FIG. 1 is a so-called spiral-type compact fluorescent lamp. However, the lamp 10 need not be a spiral-type compact fluorescent lamp, and the primary lamp tube 11 need not be a spiral tube. For example, the lamp 10 could be a so-called tubular-type compact fluorescent having a generally rectangular, bent primary lamp tube. Moreover, the lamp 10 need not be a compact fluorescent lamp. For example the lamp 10 could be a linear fluorescent lamp, such as a so-called T12 lamp. Regardless of the style of fluorescent lamp, the lamp 10 includes an amalgam for providing the mercury needed for operation of the lamp 10.

Electrical leads 12a-d connect the lamp 10 to output terminals 128a, 128b of a ballast 120 (see FIGS. 5-9). The ballast 120 could be located within a base for the lamp 10, such as a screw base, or separate from the lamp as part of a light fixture.

An exhaust tube 13 is attached to the spiral primary lamp tube 11. A bracket 14 is attached to the exhaust tube 13. The bracket could be attached to the primary lamp tube 11, or both the exhaust tube 13 and the primary lamp tube 11. As best shown in FIG. 2, the bracket has opposing first and second arms 15a, 15b that engage the exhaust tube. The opposing first and second arms 15a, 15b conform to the shape of the exhaust tube 13. In the embodiment shown, the opposing first and second arms 15a, 15b have curved profiles that conform to the cylindrical shape of the exhaust tube 13. Other profiles for the arms 15a, 15b are possible to conform to exhaust tubes of various shapes. The arms 15a, 15b can hold the bracket in place on the lamp 10 by friction (e.g., by squeezing the exhaust tube 13), by use of an adhesive, by locking components (e.g., resilient locking tabs) or by the use of additional fasteners.

The purpose of the bracket 14 is to hold a resistive heater 16 such that the resistive heater 16 is mounted near the amalgam 17 in the lamp 10. The resistive heater 16 operates while the lamp is in an OFF state, to transfer heat the amalgam 17, thereby warming the amalgam 17 while the lamp is OFF. In FIGS. 1-3, the amalgam 17 is located within the exhaust tube 13, and the resistive heater 16 is mounted to the exhaust tube 13 via the bracket 14. In certain embodiments, the amalgam can be located within the primary lamp tube, and the bracket 14 and resistive heater 16 can be mounted to the primary lamp tube.

The bracket 14 can be made from a thermally-conductive material (e.g., as opposed to an insulating material) that readily conducts heat from the resistive heater 16 to the exhaust tube 13. Thus, the bracket 14 can act as a heat bridge from the resistive heater 16 to the amalgam 17. Example thermally-conductive materials for the bracket 14 include metals, such as copper, brass or steel, in addition to other known thermally-conductive materials.

Figure 7:
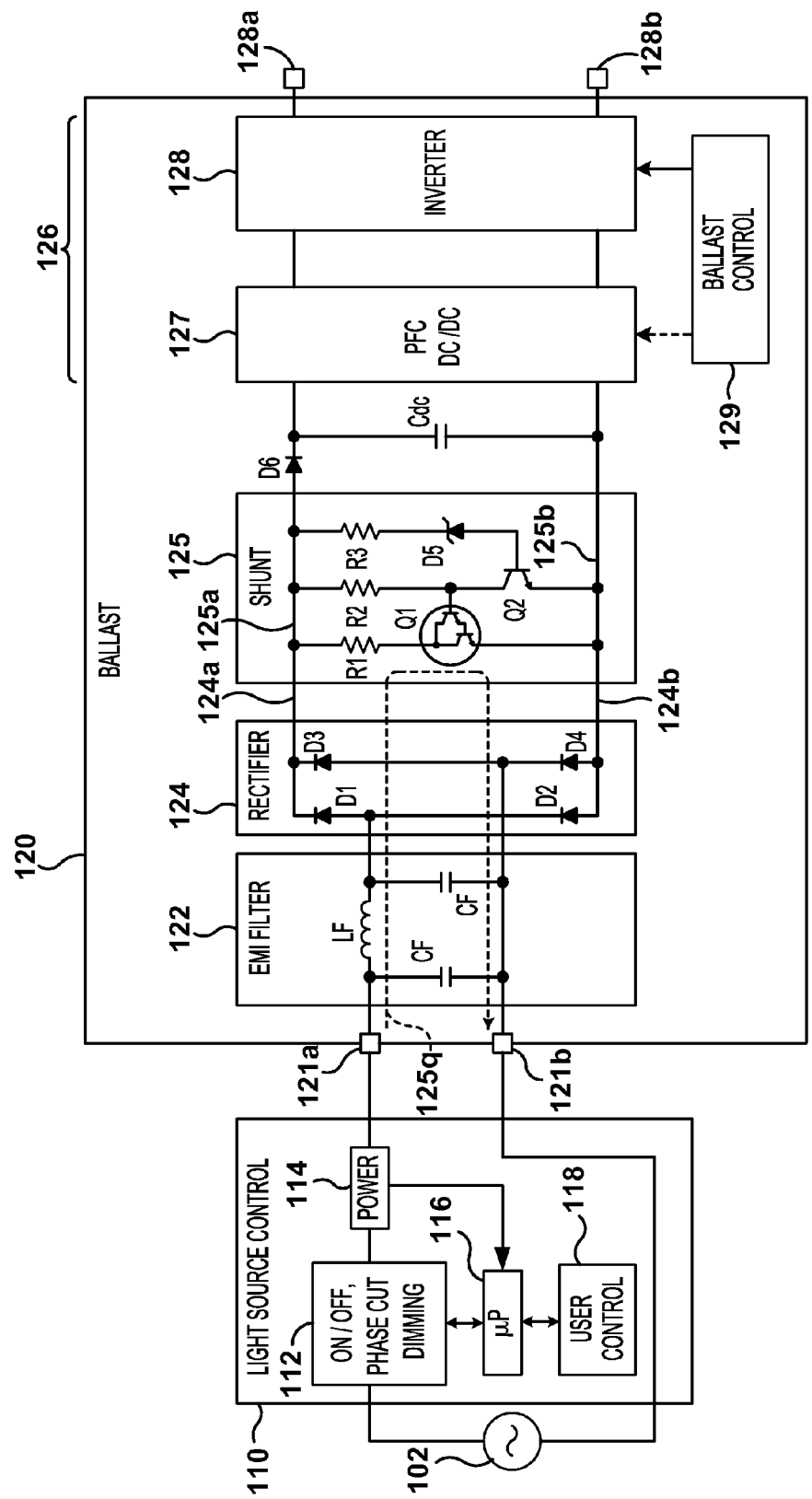
FIG. 7 is a schematic diagram showing an example ballast.
Figure 8:
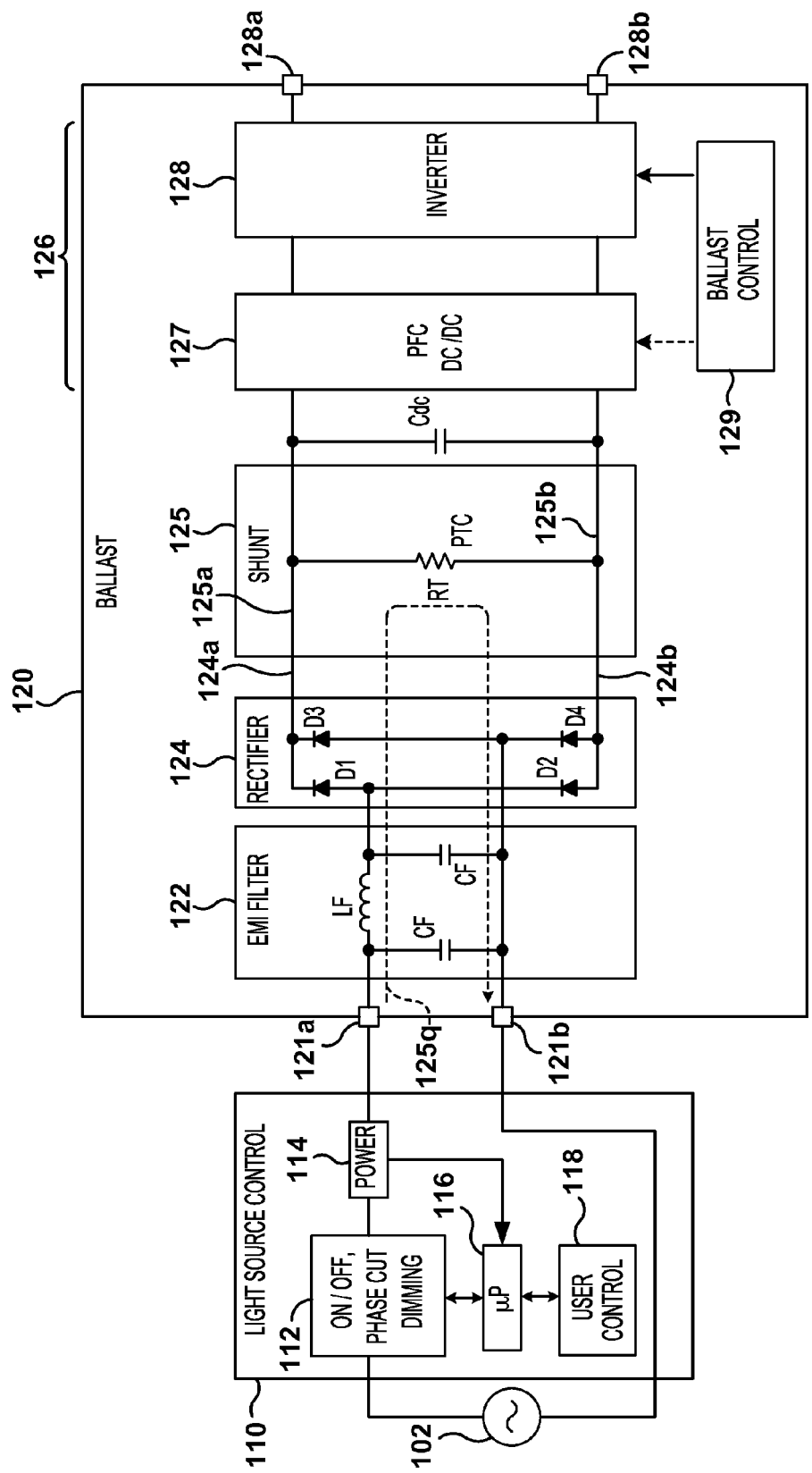
FIG. 8 is a schematic diagram showing an example ballast.
Figure 9:
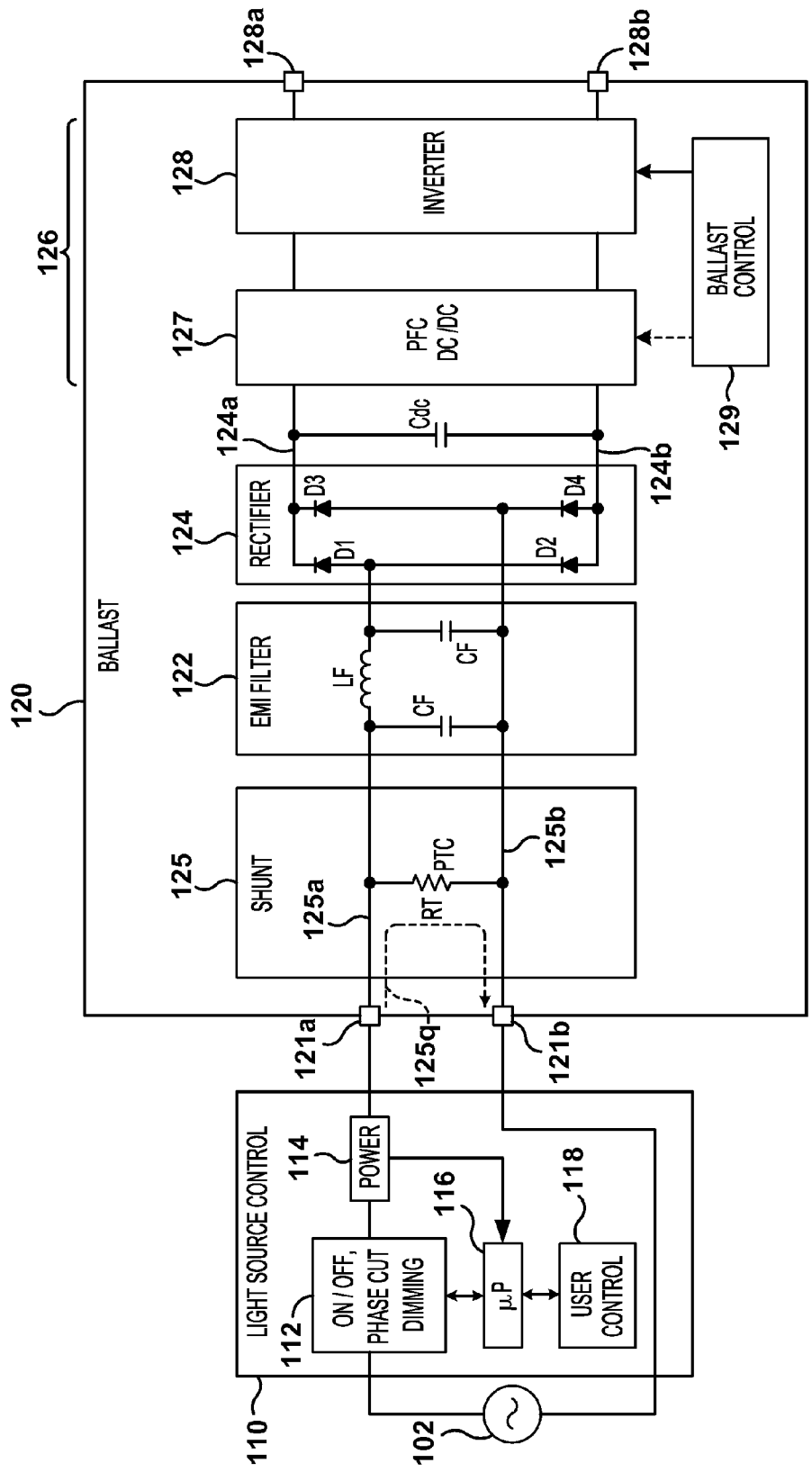
FIG. 9 is a schematic diagram showing an example ballast.

The resistive heater 16 can include one or more resistors (e.g., $R_1$ shown in FIGS. 6 and 7) and/or one or more positive temperature coefficient (PTC) resistances (e.g., RT shown in FIGS. 8 and 9). An advantage of using a PTC resistance is that its resistance increases with temperature. Thus, a resistive heater 16 employing a PTC resistance tends to be self-regulating.

Electrical leads 18a, 18b connect the resistive heater 16 to the ballast 120, such as in the manner shown in FIGS. 6-9. As discussed below, the resistive heater 16 receives electrical power from the ballast 120 while the lamp 10 is OFF (e.g., a state in which the lamp emits no usable light or substantially no usable light). Due to its proximity to the amalgam 17, the resistive heater 16 warms the amalgam while the lamp is OFF. For example, the resistive heater 16 generates 0.3-1.0 Watt while the lamp is OFF. As shown in the partial section view of FIG. 3, the resistive heater 16 is mounted next to the amalgam 17 and is separated from the amalgam by the wall of the exhaust tube 13. A positioning element 19, such as a glass rod, is located within the exhaust tube and positions the amalgam 17 within the exhaust tube 13 between a sealed end 20 of the exhaust tube and the spiral primary tube 11.

As noted above, fluorescent lamps exhibit run-up when initially turned on. A reason for this is that the amalgam is cold, and the mercury vapor pressure within the lamp is lower than optimal. Heating the amalgam when the lamp is OFF can increase the mercury vapor pressure existing when the lamp is eventually turned on, putting the initial vapor pressure closer to optimal. This can improve lamp run-up by providing an increased initial lumen output and a shorter lamp run-up time. Thus, heating the amalgam 17 while the lamp 10 is OFF can provide a solution to the run-up problem exhibited by fluorescent lighting devices.

A comparative example charting run-up measurements for a compact fluorescent lamp (e.g., FLE15/2/DV/R30 manufactured by GENERAL ELECTRIC), with and without a PTC heater for the amalgam, is shown in FIG. 4. The upper curve represents the lamp having the PTC heater. It can be seen that the initial lumen output of the lamp with the PTC heater is higher than the lamp without the PTC heater, and remains higher for the entire 60 seconds of the run-up measurement.

Figure 5:
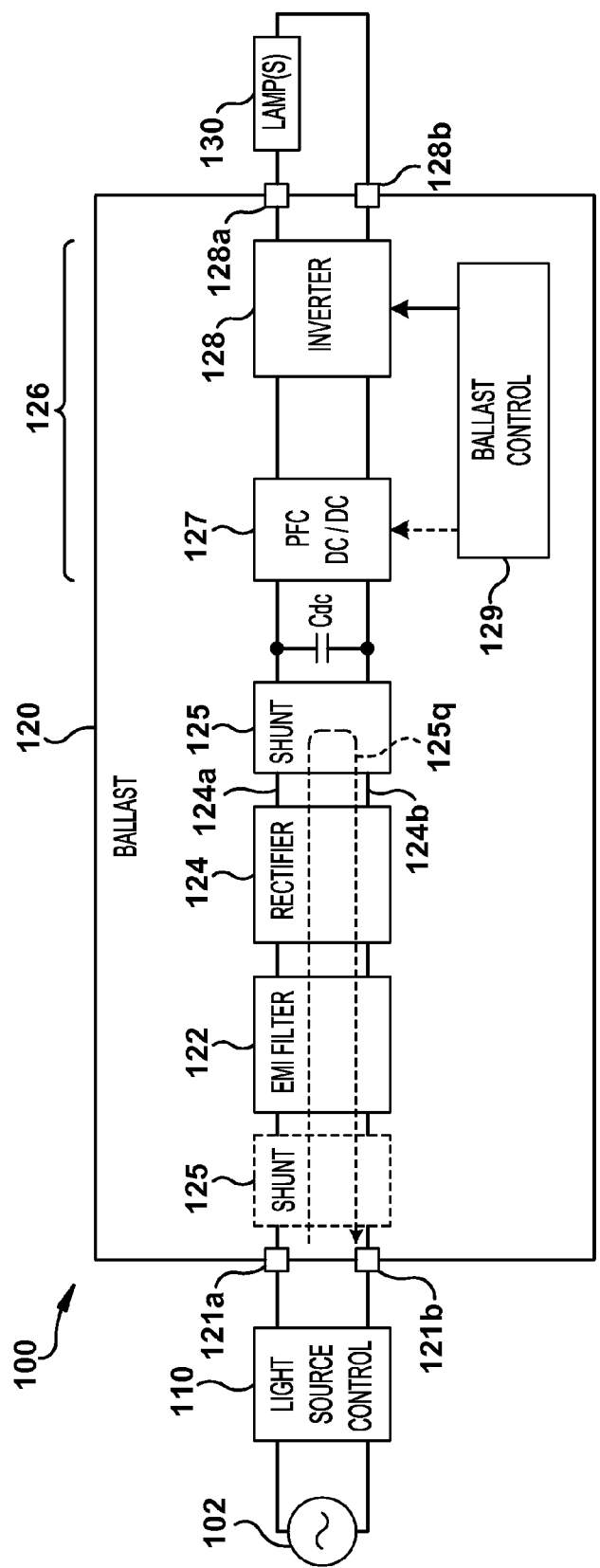
FIG. 5 is a schematic diagram showing an example ballast.

FIG. 5 illustrates an exemplary lighting system 100 including an AC power source 102 coupled with a ballast 120 through a light source control device 110, such as a dimmer or switch. The lighting system 100 includes a fluorescent lighting device comprising a ballast 120 and one or more lamps 130. The amalgam in a lamp 130 is heated by a resistive heater in the shunt circuit 125, while the lamp is in an OFF state. The ballast 120 is operable according to power provided from the source 102 to drive one or more fluorescent lamps 130, such as compact fluorescent lamps. The exemplary ballast 120 is equipped with a main power conversion system as well as a ballast controller 129. The main power conversion system is operatively coupled with the AC source 102 and the control device 110 via a ballast input 121 with first and second input terminals 121a and 121b for receiving AC input power. In certain embodiments, an EMI filter 122 is coupled to the input 121. A rectifier circuit 124 is coupled with the input 121 (e.g., coupled with the first and second input terminals 121a, 121b through the EMI filter 122). The rectifier circuit 124 includes one or more passive or active rectifiers (e.g., diodes) to convert the AC input power into rectifier DC power. The DC power is provided to first and second rectifier output terminals 124a and 124b. The ballast 120 further includes an output power stage 126 having one or more power conversion circuits 127, 128 operatively coupled with the rectifier output terminals 124a and 124b to convert the rectifier DC power to provide ballast output power to the fluorescent lamp(s). In certain embodiments, a DC bus capacitance Cdc is connected between the rectifier output terminals 124a, 124b and the output power stage 126.

The output power stage 126 includes an inverter 128 to provide AC ballast output power to the fluorescent lamp(s) 130 via output terminals 128a and 128b. In certain embodiments, the output power stage 126 further includes a DC to DC converter circuit 127 coupled with the rectifier output terminals 124a. The DC to DC converter 127 can be omitted in certain ballast implementations, with the inverter 128 directly converting the output of the rectifier 124 to provide AC output power to the fluorescent lamp(s) 130. Where included, the DC-DC converter 127 can implement power factor correction to control a power factor of the ballast 120, or power factor correction can be done in an active rectifier 124. In both situations, a ballast controller 129 is provided to regulate the output power by controlling one or both of the DC to DC converter 127 and the inverter 128.

Some light source control devices 110 include circuitry for implementing dimming functions (e.g., phase cut dimming), sensing ambient light, detecting presence or absence of persons or vehicles, RF transceiver circuitry, microprocessors or logic circuitry, etc. To operate properly, such circuitry can require quiescent current flow from the AC source 102 and across the ballast 120 when the lamp(s) 130 or the lighting device (e.g., ballast 120 and lamp(s) 130) are in an OFF state (e.g., a state in which power is not to be delivered to the lamps(s) and in which the lamps(s) emit no usable light or substantially no usable light.) The control device 110 has an ON state in which power is delivered to the lamp(s) 130 and an OFF state in which a non-zero quiescent current flows through the ballast 120 while the lamp(s) 130 are OFF.

The exemplary ballast 120 accommodates this situation via the shunt circuit 125, to provide a conduction path for such quiescent current flow. The shunt circuit 125 is connected upstream of the output power stage 126 and the bus capacitance Cdc so as to prevent the output power stage from providing power to the lamp(s) 130, and to thereby prevent or mitigate flickering or flashing of the lamp(s) 130 when the control device 110 is in an OFF state. The shunt circuit 125 senses or otherwise reacts to the ON or OFF state of the control device 110, and during the OFF-state, limits the voltage of the DC bus capacitor Cdc, thereby preventing undesired starting of the lamp(s) 130. When the control device 110 changes to the ON state, the shunt circuit 125 provides a high impedance to allow the DC bus capacitor Cdc to charge and thus enables provision of power by the output stage 126 to the lamp(s) 130, without adversely impacting the ballast power efficiency and the light output efficacy. The disclosed usage of the shunt circuitry 125 thus provides a solution to the above mentioned flashing problems with low power consumption to aid the proper operation of the light source control device 110 in the ON and OFF states, and provides better lamp efficacy than prior solutions and better compatibility with control devices.

As shown in FIG. 5, the shunt circuit 125 can be connected in various locations between the ballast input 121 and the output power stage 126. In certain exemplary embodiments, an active or passive shunt circuit 125 is connected between the rectifier output terminals 124a, 124b and the DC bus capacitance Cdc (as further detailed in FIGS. 6, 7 and 8 below), providing an OFF state conductive path 125q for conducting quiescent current in the ballast 120, to accommodate quiescent power for an OFF state of certain control devices 110. In other embodiments (e.g., as shown in dashed lines in FIG. 5 and as shown in FIG. 9), a passive shunt circuit 125 can be connected between the first and second input terminals 121a, 121b and the rectifier circuit 124.

In various embodiments, referring to FIGS. 6-9, the ballast 120 is connected to the AC power source 102 via an intelligent light source control device 110, including an on/off control circuit 112 that may, but need not, implement phase cut dimming control to selectively cut portions of the input AC sinusoidal waveform provided by the AC source 102. A power circuit 114 derives circuit power from the current flow through the control device 110 and provides power to power a microprocessor 116 or other logic circuitry. The microprocessor 116 or other logic circuitry controls operation of the on/off control circuit 112, and can receive commands or inputs from a user control circuit 118. The user control circuit 118 can include one or more buttons, knobs, or other user interface implements and can include a display or other output means for interfacing with a user. The control device 110 can further include one or more sensors or transceivers (not shown) to implement lighting control functions (e.g., on/off, dimming level control) according to sensed conditions (ambient light levels, presence or absence of persons or vehicles in a given sensed area, etc.) and/or according to lighting control commands received from an external source.

Figure 6:
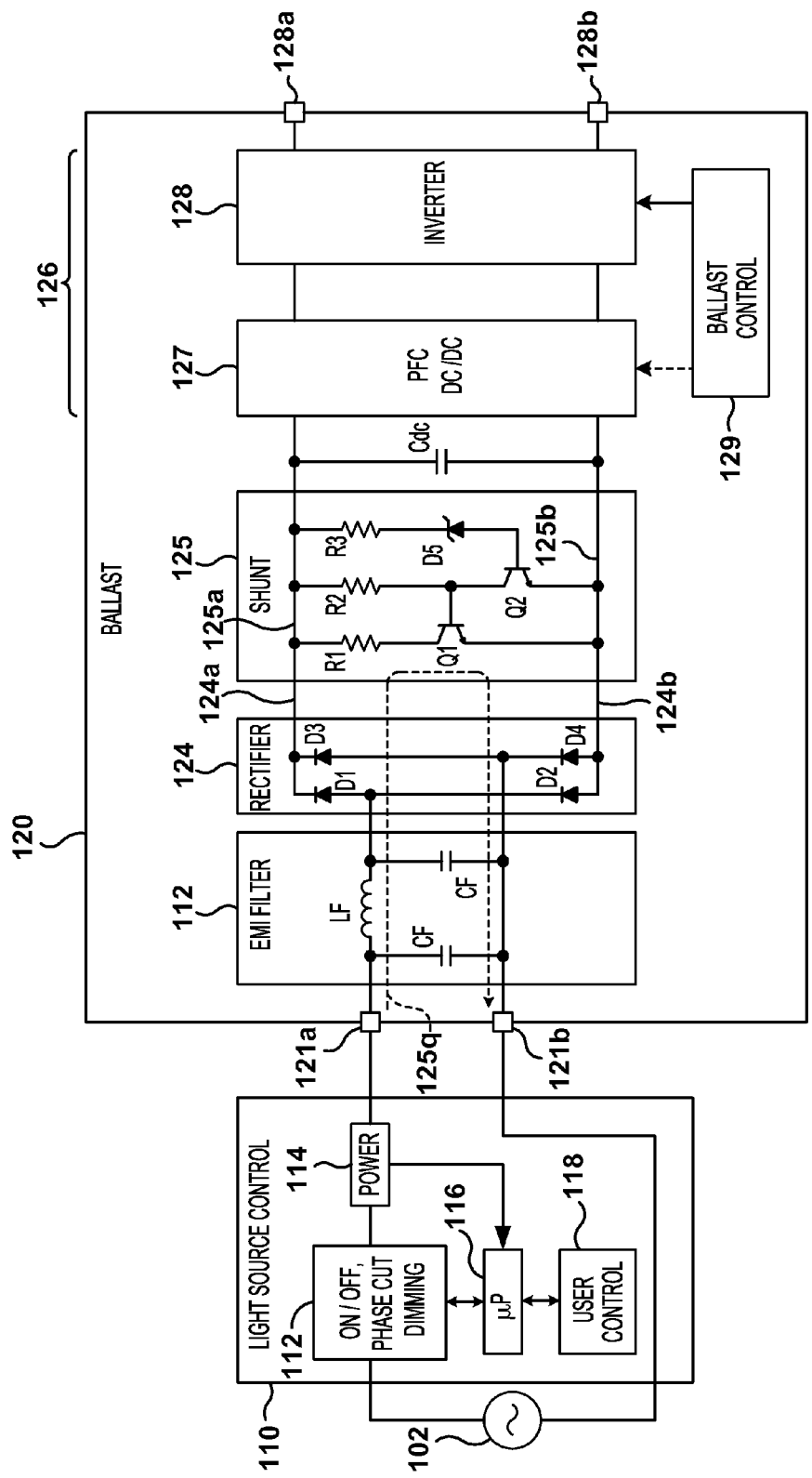
FIG. 6 is a schematic diagram showing an example ballast.

FIGS. 6 and 7 show embodiments in which the shunt circuit 125 includes first and second shunt circuit nodes 125a and 125b, respectively, connected between the ballast input 121 and the DC bus capacitance Cdc. In these examples, the EMI filter includes a C-L-C filter circuit with an input parallel capacitance CF, a series inductance LF and a further parallel filter capacitance CF. A passive full bridge rectifier 124 is constructed using diodes D1-D4 forming a rectifier bridge circuit receiving the AC input power through the EMI filter 122 and providing rectifier DC output power at the rectifier output terminals 124a and 124b.

The active shunt circuits 125 in FIGS. 6 and 7 receive the output of the rectifier 124 and provide a high impedance between the shunt circuit nodes 125a and 125b when the AC input power (e.g., voltage level) is greater than or equal to a designed threshold value. In this normal mode of operation (the ON state of the light source control device 110 and lamp(s) 130, for either full on or dimming level control operation), the high impedance of the shunt circuit 125 does not provide any significant loading to the rectifier output and thus does not adversely affect the energy efficiency of the ballast 120 and does not reduce the light efficacy.

The active shunt circuits 125 of FIGS. 6 and 7 have a variable impedance circuit including NPN transistors Q1 and Q2 and associated resistors R1 and R2, with Q1 having a collector terminal coupled with the first shunt circuit node 125a through resistor R1, an emitter terminal coupled with the second shunt circuit node 125b, and a base control terminal coupled with a node joining the collector of Q2 and the resistor R2. The base of Q2 is coupled to a sensing circuit including a Zener diode D5 and a resistance R3 coupled between the first shunt circuit node 125a and the base control terminal of Q2 to selectively change the impedance of Q1 based on the DC bus voltage across the first and second shunt circuit nodes 125a and 125b.

In the normal (ON) state of the control device 110, the rectifier 124 provides a relatively high DC bus voltage across the shunt circuit nodes 125a and 125b. In this condition, the DC voltage across the Zener diode D5 exceeds the Zener voltage Vz of D5, and D5 conducts creating a voltage across R3 such that the base-emitter voltage of Q2 (Vbe) causes Q2 to turn on. With Q2 on, the collector voltage of Q2 (Vbe of Q1) is brought to ground or near-zero, and thus Q1 turns off and does not conduct. In an embodiment, as exemplified in FIGS. 6, Q1 and Q2 can be NPN bipolar transistors such as MMBTA42/PLP (or Q1 can be constructed as two such NPN transistors, or as a Darlington pair as shown in the embodiment of FIG. 7) and the Zener diode D5 can be a BZX84C18V/PLP with a Vz of 18 volts. In the embodiment of FIG. 6, moreover, R1 can be 100 Ω, R2 can be 1MΩ, and R3 can be 220 kΩ Conduction in the ON state through the resistors R2 and R3 is small and does not significantly impact the efficiency of the ballast 120 when the AC input power (e.g., voltage level) to the ballast 120 is at or above a lighting power level to provide full ON or dimmed output from the lamp(s) 130. In one implementation of the embodiment of FIG. 7, transistor Q1 can be a Darlington MJE13003/TO, R1 can be 100 Ω, R2 can be 220 KΩ, R3 can be 100 kΩ, and Zener diode D5 can be a 68 volt device such as a BZx84C68/PLP. In the embodiment of FIG. 7, moreover, a further diode D6 is provided in the upper DC bus connection between the shunt circuit 125 and the DC capacitance Cdc.

When the control device 110 is placed into an OFF mode or state, power is not to be provided to the lamp(s) 130. Thus, the lamp(s) 130 and lighting device (e.g., ballast 120 and lamp(s) 130) are also in the OFF state because, even though the ballast 120 might consume some power, the lamps(s) 130 emit no usable light or substantially no usable light. In this condition, the input power (e.g., voltage level) to the ballast 120 is below the designed threshold value, and the shunt circuit 125 provides a low impedance between the shunt circuit nodes 125a and 125b. In this situation, the DC bus voltage across the shunt circuit nodes 125a and 125b is non-zero, but low enough that the voltage across D5 is less than its Vz (e.g., below 18 volts in the example of FIG. 6), and thus Q2 remains off. In this condition, the Vbe of Q1 is high enough to turn Q1 on, and thus the quiescent current from the control device 110 can flow through the path 125q through the resistance R1 and through Q1. Resistance R1 is an example of the resistive heater discussed above, and can be located near the amalgam to heat the amalgam while the lamp is in the OFF state. Thus, the resistive heater R1 is operatively coupled with transistor Q1 such that the shunt circuit 125 selectively supplies electrical power to the resistive heater R1 through Q1 when the lamp(s) are in the OFF state, to heat the amalgam while the lamp(s) are in the OFF state.

It is noted that the quiescent current path 125q is upstream of the DC bus capacitance Cdc, and thus Cdc preferably does not charge at all or in any event not enough to activate the power output stage 126. Thus, the shunt circuit 125 provides the path 125q for quiescent current while preventing the provision of power to the lamp(s) 130, thereby mitigating flashing or flickering when the AC input power is below the designed threshold value. In this regard, the designed threshold value is less than a normal operating power range for powering the lamp(s) 130, and the designed threshold value in this embodiment is greater than an OFF-state quiescent power level of the light source control device 110 coupled between the AC source 102 and the ballast 120.

It is to be appreciated that the usage of the shunt circuitry 125 to heat the amalgam as discussed herein, can simultaneously provide solutions to both the run-up problem discussed above, and the flashing problems upon low power consumption discussed above.

FIG. 8 shows another embodiment with a passive shunt circuit 125 connected between the rectifier output terminals 124a, 124b and the DC bus capacitor Cdc. In this embodiment, the passive shunt circuit 125 includes a PTC resistance RT coupled between the first and second shunt circuit nodes 125a and 125b. PTC resistance RT is another example of the resistive heater discussed above, and can be located near the amalgam to heat the amalgam while the lamp is in the OFF state. In the normal (ON) state of the control device 110, the PTC resistance RT becomes a high impedance, with the rectifier output thereafter being primarily loaded by the DC bus capacitance Cdc, which in turn allows provision of power from the output stage 126 to the lamp(s) 130. When the control device 110 changes to the OFF state, the DC bus voltage drops, allowing the resistance RT to cool and become a lower impedance while heating the amalgam. In this condition, the PTC RT provides a conduction path 125q for quiescent current flow from the control device 110, and prevents significant charging of the capacitance Cdc, while heating the amalgam.

Another embodiment is shown in FIG. 9, in which the nodes 125a and 125b of the passive shunt circuit 125 are coupled between the ballast input 121 and the rectifier 124. In this regard, the PTC resistance RT provides similar selective impedance control for the AC power received by the rectifier 124. In the ON state of the control device 110, the PTC resistance RT becomes a high impedance, and thus does not adversely impact the operation of the rectifier or the power output stage 126. In this condition, therefore, power is provided from the output stage 126 to the lamp(s) 130 for normal operation (full on or dimming control). In the OFF state of the control device 110, the PTC device RT cools and thus provides a lower impedance conductive path 125q for the quiescent current from the control device 110. In this condition, the rectifier output is insufficient to significantly charge the capacitance Cdc, and the power output stage 126 remains off to prevent flicker or flashing of the light source(s) 130.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A fluorescent lighting device, comprising,
a spiral primary lamp tube;
a ballast;
an exhaust tube attached to the primary lamp tube;
an amalgam located within the exhaust tube;
a resistive heater operatively coupled with the ballast to receive electrical power from the ballast while the fluorescent lighting device is in an OFF state;
a bracket holding the resistive heater near the amalgam and along an exterior surface of the exhaust tube, wherein the bracket and the resistive heater are located exterior of both of the spiral primary lamp tube and the exhaust tube, and
wherein the resistive heater is mounted near the amalgam to transfer heat to the amalgam while the fluorescent lighting device is in the OFF state.

2. The fluorescent lighting device of claim 1, wherein the bracket comprises a thermal-conductive material that readily conducts heat from the resistive heater to the exhaust tube.

3. The fluorescent lighting device of claim 1, wherein the resistive heater comprises a positive temperature coefficient (PTC) resistance.

4. A fluorescent lighting device, comprising,
a ballast;
a tube;
an amalgam located within the tube;
a resistive heater operatively coupled with the ballast to receive electrical power from the ballast while the fluorescent lighting device is in an OFF state,
wherein the resistive heater is mounted near the amalgam to transfer heat to the amalgam while the fluorescent lighting device is in the OFF state, and
wherein the ballast comprises a transistor, and wherein the resistive heater is operatively coupled with the transistor such that the ballast selectively supplies electrical power to the resistive heater through the transistor.

5. The fluorescent lighting device of claim 4, further comprising a bracket attached to the tube, the bracket holding the resistive heater near the amalgam.

6. The fluorescent lighting device of claim 5, wherein the tube is an exhaust tube of a fluorescent lamp,
wherein the resistive heater comprises a positive temperature coefficient (PTC) resistance, and
wherein the bracket comprises opposing first and second arms that engage the exhaust tube, thereby holding the PTC resistance near the amalgam located within the exhaust tube.

7. The fluorescent lighting device of claim 5, wherein bracket comprises a thermal-conductive material that readily conducts heat from the resistive heater to the tube.

8. The fluorescent lighting device of claim 5, wherein the tube is an exhaust tube, and wherein the resistive heater comprises a positive temperature coefficient (PTC) resistance, the fluorescent lighting device further comprising a spiral primary lamp tube to which the exhaust tube is attached.

9. The fluorescent lighting device of claim 4, wherein the tube is an exhaust tube of a fluorescent lamp.

10. The fluorescent lighting device of claim 4, wherein the resistive heater comprises a positive temperature coefficient (PTC) resistance.

11. A fluorescent lighting device, comprising,
a ballast;
a tube;
an amalgam located within the tube;
a resistive heater operatively coupled with the ballast to receive electrical power from the ballast while the fluorescent lighting device is in an OFF state; and
a bracket attached to the tube, the bracket holding the resistive heater near the amalgam, wherein the resistive heater is mounted near the amalgam to transfer heat to the amalgam while the fluorescent lighting device is in the OFF state, wherein the tube is an exhaust tube, and wherein the resistive heater comprises a positive temperature coefficient (PTC) resistance, the fluorescent lighting device further comprising a spiral primary lamp tube to which the exhaust tube is attached, and wherein the exhaust tube comprises a sealed end, the fluorescent lighting device further comprising a positioning element within the exhaust tube and located between the sealed end of the exhaust tube and the amalgam, thereby positioning the amalgam within the exhaust tube between the sealed end of the exhaust tube and the spiral primary lamp tube.

12. A ballast for powering a fluorescent lamp that includes an amalgam, the ballast comprising:
- a ballast input with first and second input terminals for receiving AC input power;
- a rectifier circuit with first and second rectifier output terminals, wherein the rectifier circuit is operatively coupled with the ballast input to convert the AC input power into DC power provided to the first and second rectifier output terminals;
- an output power stage comprising a power conversion circuit operatively coupled with the rectifier output terminals to convert the DC power into ballast output power for the fluorescent lamp;
- a shunt circuit connected between the ballast input and the output power stage, the shunt circuit comprising a resistive heater that operates while the fluorescent lamp is in an OFF state, thereby heating the amalgam while the fluorescent lamp is in the OFF state.

13. The ballast of claim 12, further comprising a DC bus capacitance connected between the rectifier output terminals and the output power stage, wherein the shunt circuit is connected between the rectifier output terminals and the DC bus capacitance.

14. The ballast of claim 12, wherein the resistive heater comprises a positive temperature coefficient (PTC) resistance.

15. The ballast of claim 14, wherein the PTC resistance is located within a bracket adapted to engage a portion of the fluorescent lamp.

16. The ballast of claim 15, wherein the bracket comprises a thermal-conductive material that readily conducts heat generated by the PTC resistance.

17. The ballast of claim 15, wherein the bracket comprises opposing first and second arms adapted to engage an exhaust tube of the fluorescent lamp.

18. The ballast of claim 12, wherein the shunt circuit comprises a transistor, and wherein the resistive heater is operatively coupled with the transistor such that the shunt circuit selectively supplies electrical power to the resistive heater through the transistor.

19. The ballast of claim 12, wherein the shunt circuit is connected between the first and second input terminals and the rectifier circuit.

* * * * *

UNITED STATES PATENT AND TRADEMARK OFFICE
CERTIFICATE OF CORRECTION

| | | |
|---|---|---|
| PATENT NO. | : 8,648,530 B2 | Page 1 of 1 |
| APPLICATION NO. | : 13/173223 | |
| DATED | : February 11, 2014 | |
| INVENTOR(S) | : Schmidt et al. | |

It is certified that error appears in the above-identified patent and that said Letters Patent is hereby corrected as shown below:

In the specification

Column 3, line 25, please delete "$R_1$" and replace with "R1"

Signed and Sealed this
Third Day of June, 2014

Michelle K. Lee
*Deputy Director of the United States Patent and Trademark Office*